(No Model.)

A. C. STILES.
JOURNAL BEARING.

No. 495,919. Patented Apr. 18, 1893.

Witnesses,
J. N. Shumway
Lillian D. Kelsey

Albert C. Stiles,
Inventor
By atty Earle & Seymour

UNITED STATES PATENT OFFICE.

ALBERT C. STILES, OF NEW HAVEN, CONNECTICUT.

JOURNAL-BEARING.

SPECIFICATION forming part of Letters Patent No. 495,919, dated April 18, 1893.

Application filed May 18, 1892. Serial No. 433,425. (No model.)

*To all whom it may concern:*

Be it known that I, ALBERT C. STILES, of New Haven, in the county of New Haven and State of Connecticut, have invented a new Improvement in Journal-Bearings; and I do hereby declare the following, when taken in connection with accompanying drawings and the letters of reference marked thereon, to be a full, clear, and exact description of the same, and which said drawings constitute part of this specification, and represent, in—

Figure 1:
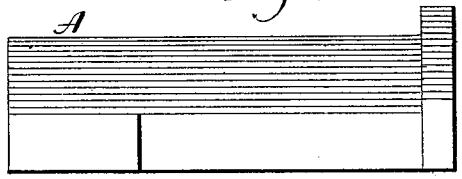
Figure 2:
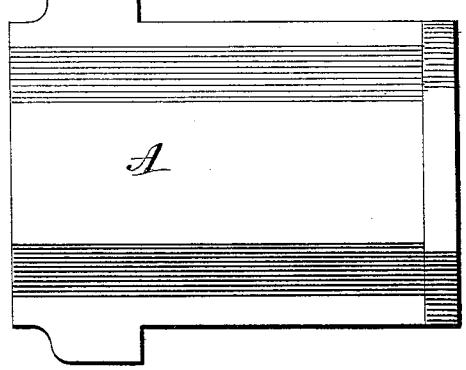
Figure 3:
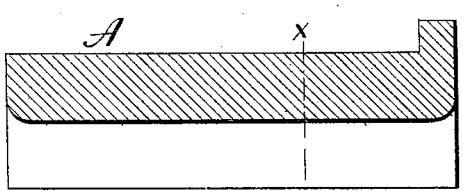
Figure 4:
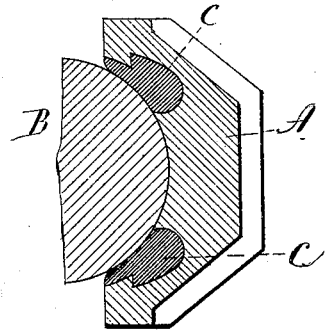

Figure 1, a side view of the bearing; Fig. 2, a top view of the same; Fig. 3, a longitudinal central section; Fig. 4, a transverse section cutting on line $x$—$x$ of Fig. 3, and Fig. 5, a modification.

This invention relates to an improvement in bearings for journals, with special reference to bearings for car-axles.

In the more general construction of this class of bearings, the body is made from cast-metal, and recessed upon its inside so as to leave a space between the body and the axle, which space is filled with Babbitt metal. The shape of the recess is made without special regard to the shape of the journal, dependence being had at all times upon the presence of the Babbitt metal to give the requisite shape for the bearings. Consequently when the metal is worn away or destroyed, by heat or otherwise, the journal does not find a bearing of corresponding shape in the body.

The object of my invention is to construct the body so that when the Babbitt shall be worn away or destroyed, the journal will find a suitable bearing in the body upon which it may run with safety, and the invention consists in the construction of the bearing as hereinafter described and particularly recited in the claims.

Figure 5:
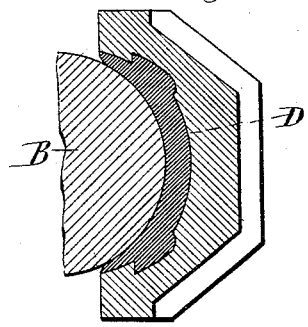

A, represents the body of the bearing. The face side of the bearing is recessed, and the bottom of the recess curved, in transverse section, in exact correspondence with the curvature of the periphery of the journal B. Longitudinally across this curved surface undercut or interlocking recesses are formed, into which Babbitt or other suitable metal C, is run to fill those recesses, and present a shape to the journal having the same curvature as its periphery, and as seen in Fig. 4. The Babbitt metal thus introduced forms the working surface for the journal, but the body A, presents to the journal a surface exactly like its shape, so that should the Babbitt be destroyed as by heating or otherwise, the journal will still find a suitable support in the body. The recesses into which the Babbitt is cast open at the edges so as to give a suitable thickness of metal at the extreme outer edges. As thus illustrated the Babbitt does not extend over the whole bearing surface of the journal, but it may so extend if preferred, as seen in Fig. 5, in which the recess of the bearing is made of the same curvature as the curvature of the periphery of the journal as shown, and undercut for the interlocking of the Babbitt metal, and then the bearing is placed upon a form of the same curvature as the journal, but distant therefrom so as to leave a space between the bottom of the recess and the form. Then Babbitt, or other metal is poured into this space, as represented at D, Fig. 5, the Babbitt interlocking with the surface of the recess in the body so as to be firmly secured in place. Should the Babbitt or other metal be destroyed, as by heating or otherwise, its escape will permit the body to come upon the journal, and the surface of the recess being the same in curvature as the surface of the journal will form a suitable bearing for the journal for the time being, so that the accidental displacement of the Babbitt does not interfere with the proper working of the journal, as is the case when the cast metal body of the bearing has its recess shaped irrespective of the shape of the journal which is to run in the bearing.

I claim—

1. A journal-bearing having its body formed with a recess of the same curvature, in transverse section, as the curvature of the journal which the bearing is to receive, and adapted to receive and retain a wearing surface of Babbitt or other suitable metal, substantially as set forth, and whereby should the said metal be eliminated, the journal will have a bearing which will fit it, in the said body.

2. A journal bearing having its body formed with a recess of the same curvature, in transverse section, as the curvature of the journal which the bearing is to receive, and constructed with one or more longitudinal under-cuts located to one side of the center of the recess, to receive and interlock the Babbitt, or other suitable metal run into the same, to form a wearing surface for the journal, substantially as described, and whereby should the said
5 metal be eliminated, the journal will have a bearing which will fit it, in the said body, substantially as described.

In testimony whereof I have signed this specification in the presence of two subscribing witnesses.

ALBERT C. STILES.

Witnesses:
JAMES R. LYON,
NEWTON H. COX.